(No Model.) 2 Sheets—Sheet 1.

L. A. ASPINWALL.
POTATO DIGGER.

No. 387,278. Patented Aug. 7, 1888.

Witnesses
Harold Serrell
Chas. H. Smith

Inventor
per Lewis Augustus Aspinwall
Lemuel W. Serrell
atty (No Model.) 2 Sheets—Sheet 2.
L. A. ASPINWALL.
POTATO DIGGER.
No. 387,278. Patented Aug. 7, 1888.
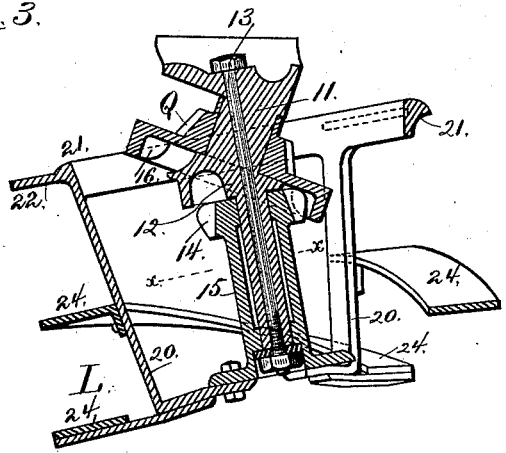
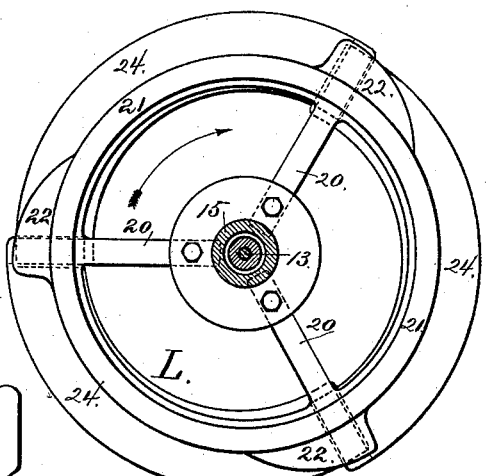
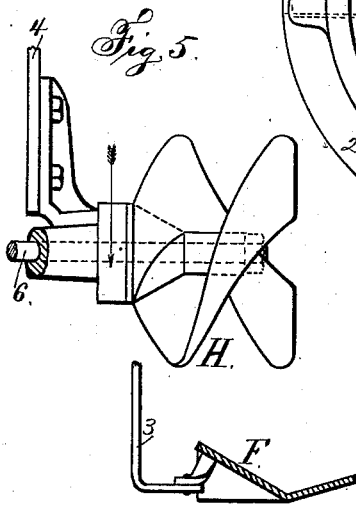
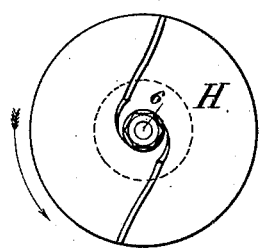
Witnesses.
Harold Serrell.
Chas H Smith
Inventor
Lewis Augustus Aspinwall
per Lemuel W. Serrell,
atty

UNITED STATES PATENT OFFICE.

LEWIS AUGS. ASPINWALL, OF THREE RIVERS, MICHIGAN, ASSIGNOR TO THE ASPINWALL MANUFACTURING COMPANY, OF SAME PLACE.

POTATO-DIGGER.

SPECIFICATION forming part of Letters Patent No. 387,278, dated August 7, 1888.

Application filed March 12, 1888. Serial No. 266,926. (No model.)

*To all whom it may concern:*

Be it known that I, LEWIS AUGUSTUS ASPINWALL, of Three Rivers, in the county of St. Joseph and State of Michigan, have invented an Improvement in Potato-Diggers, of which the following is a specification.

My invention is an improvement on potato-diggers heretofore invented by me, and it relates to the combination of devices herein set forth, whereby the leveler is made to separate the vines and potatoes with greater certainty than heretofore, and the revolving screw, which also acts to elevate the potatoes and hold them up while the earth falls down, is more reliable in its action.

Figure 2:
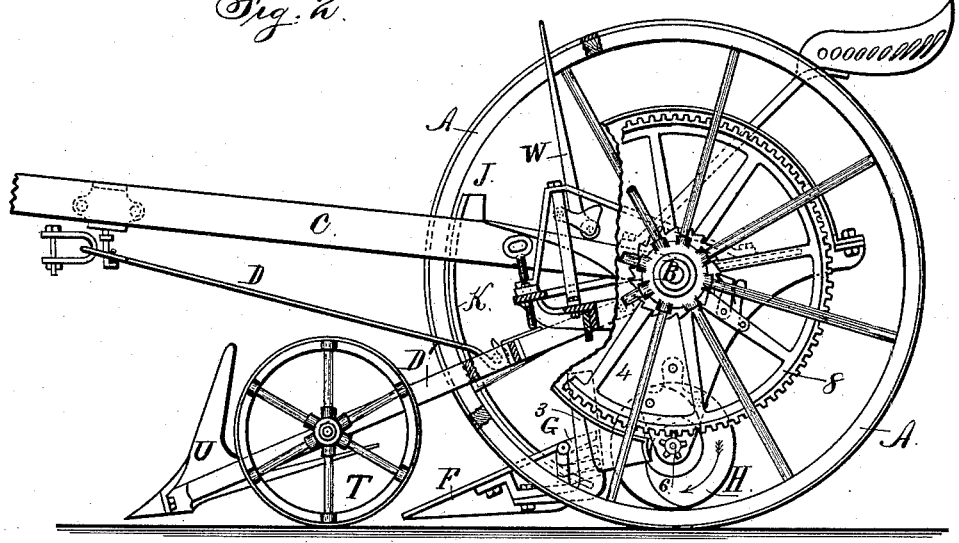
Figure 1:
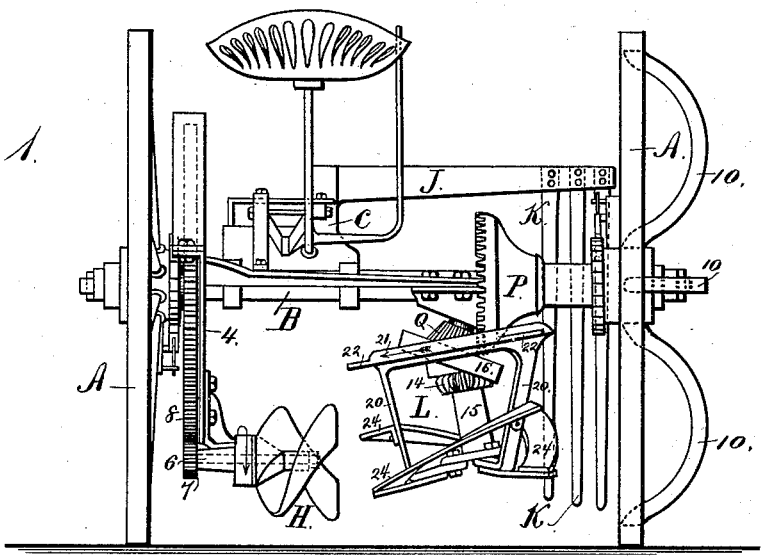

In the drawings, Figure 1 is a rear elevation of the machine. Fig. 2 is an elevation of the left side of the machine, partially in section. Fig. 3 is a vertical section, and Fig. 4 a section plan view at the line *x x*, of the revolving leveler. Fig. 5 is a detached plan, in larger size, of the lifting-screw. Fig. 6 is an end view of the same. Fig. 7 is a detached plan view of the plow and the lifting-screw, and Fig. 8 is a section of the plow.

The driving-wheels A are upon the axle B, and there is a tongue or pole, C, to which the horses are attached. The draft-rod D is connected with the frame D', upon which is a lead-wheel, T. The plow F is made use of for raising the earth in which is contained the potatoes, and at the rear of the plow F are the fingers G, similar to those shown in my patents, No. 264,603, dated September 19, 1882, and No. 372,351, dated November 1, 1887, and this plow F is supported upon a bracket, 3, that extends out laterally from the side plate, 4, forming part of the frame of the machine.

The screw H is upon the horizontal shaft 6, having a pinion, 7, that is driven by the gear-wheel 8, and this screw H is preferably of hardened or polished steel, and it revolves in the direction indicated by the arrows and acts to raise up the earth and potatoes and throw them to the right toward the spreader L, hereinafter described. The plate I is formed with the plow F, and it is inclined upwardly toward the spreader L, so as to aid in passing the potatoes to the right and in preventing any potatoes or stones being thrown by the lifting-screw H into the spreader L.

Upon the pole C an arm or cross-piece, J, is bolted, which extends toward the periphery of the right wheel A, and near the end thereof are the fingers K, which hang down from such cross-piece J and are adjacent to the wheel A, and these fingers K are curved backwardly, corresponding, or nearly so, to the curvature of the rim of the drive-wheel, so that any potatoes that might otherwise be thrown by the spreader L forward and fall beneath the wheel A are caught by said fingers K and, sliding down the same, fall upon the surface in such a position that the wheel cannot run over the same.

The right wheel A is not provided with the usual spokes; but the spokes 10 thereof are curved outwardly, and I only make use of four such spokes. The object of this construction of wheel is to prevent the spokes interfering with the free passage of any potatoes, stones, vines, or earth through the wheel, as the same may be scattered or spread by the action of the spreader L.

Upon one or both wheels A is a pawl, and upon the axle B is a ratchet-wheel, as usual in this class of machines, for giving motion to the axle; and there is also fitted upon this axle B the gear-wheel P, that gears into the pinion Q, that is upon the inclined gudgeon 11 beneath the frame of the machine, and below this gudgeon is a tubular bearing, 12, for the spreader L, and the bolt 13 connects the parts together. There is a pinion, 14, at the upper end of the tubular shaft 15 of the spreader. The pinion 14 receives its motion from teeth 16 around the inside flange of the pinion Q. This is similar to the device shown in my aforesaid patent, No. 372,351, except that the pinion 14 is smaller, so that the spreader L is revolved with increased velocity. At the bottom of the tubular shaft 15 is a flange, to which the arms 20 are bolted, and said arms extend up to the rim 21 in the form of an open basket, and there are cam-shaped projections 22 at suitable distances apart around the rim 21, and upon these arms 20 the elevating and spreading inclines 24 are fastened. I have represented three of such inclines.

The rim 21 prevents the vines or weeds coming into contact with or winding around the spreader or the gear-wheels thereof, and the cam-shaped projections 22 serve to throw off and separate any such vines or weeds that may lie against the rim 21. Upon reference to Fig. 7 it will be seen that the axis of the revolving screw H is nearly in line with the front part of the spreader L, and hence the screw H will force the earth and potatoes up the incline I and upon the spreader L, and this spreader, revolving rapidly, carries the earth and potatoes around on the front part of the said spreader and toward the right wheel of the machine, and the inclines 24 run under the earth and potatoes, and the rapid movement of the spreader causes the potatoes to be thrown to the right and from that side of the spreader which is next to the right wheel A, and the potatoes are under-run by the inclines 24 and raised up, so that they fall upon the surface of the earth as the same is scattered by the action of the spreader. Thereby the potatoes are not buried, nor are they scattered promiscuously; but they are almost all thrown off to the right by the centrifugal force and pass through the open wheel and are left upon the surface of the earth. The colter and plow U are upon the front end of the frame D', and are similar to those represented in my aforesaid patent, and this colter U, frame D', and wheel T can be raised or lowered by the action of the lever W, as in my said patents.

I remark that the incline I, intervening between the screw H and the spreader L, is of great utility, because it serves to elevate the potatoes and earth above and upon the inclines 24 of the spreader, so that the separation of the earth from the potatoes is much more perfect, because the potatoes are lifted higher and the earth has a better opportunity to fall away as it is pulverized, before the potatoes leave the inclines 24, and pass to the rear.

I claim as my invention—

1. The combination, with the plow F, of the screw H, and the gearing for revolving the same, the revolving spreader L, and the incline I, between the screw H and the said spreader, substantially as set forth.

2. The spreader L, having the arms 20, inclines 24, and rim 21, in combination with the tubular shaft 15, and gearing for revolving the same, substantially as set forth.

3. The spreader L, having the arms 20 and inclines or blades 24, and the rim 21, in combination with the gearing for revolving the same, and the screw H, which acts to deliver the earth and potatoes upon the spreader, substantially as set forth.

4. The plow F and fingers G, in combination with the incline I, the screw H, opposite to the incline I, and the spreader L, behind the incline and with the front portion thereof in line, or nearly so, with the axis of the screw, so that the earth and potatoes pass upon the front portion of the spreader and are thrown off, substantially as set forth.

5. The combination, with the spreader L and the gearing for revolving the same, of the open wheel A, having the curved spokes 10, substantially as and for the purposes set forth.

6. The combination, with the plow and the spreader, of the fingers K, curved downwardly and backwardly and adjacent to the wheel A, for preventing the potatoes being thrown by the spreader beneath the wheel A, substantially as set forth.

7. The combination, in a potato-digger, of the plow F, for raising the earth and potatoes, the fingers G at the rear edge of the said plow, the revolving screw H, behind the fingers, acting to separate the earth and potatoes and pass them to the rear and toward the separator, the incline I, up which the earth and potatoes are passed by the action of the screw, the revolving separator L, having arms or inclines, and the open wheel A, having curved spokes, substantially as set forth.

Signed by me this 3d day of March, 1888.

L. AUGS. ASPINWALL.

Witnesses:
WALTER ALEXANDER,
D. W. THAYER.